Figure 1:
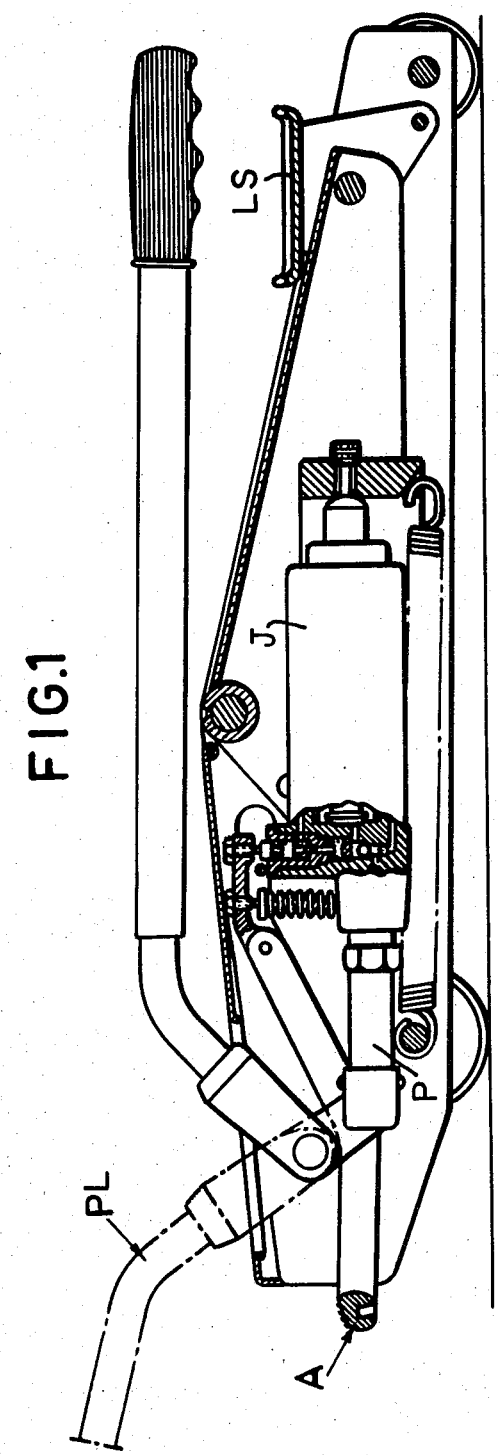

United States Patent
Bjork

[15] 3,687,417
[45] Aug. 29, 1972

[54] AUTOMATIC CUSHIONING VALVE

[72] Inventor: Bengt Anders Bjork, Eskilstuna, Sweden

[73] Assignee: Domkraft AB Nike, Eskilstuna, Sweden

[22] Filed: Oct. 22, 1970

[21] Appl. No.: 83,174

[30] Foreign Application Priority Data

Oct. 22, 1969 Sweden ............... 14461/69

[52] U.S. Cl. .............................. 254/93 R, 137/504
[51] Int. Cl. ........................... B66f 7/14, B60p 1/48
[58] Field of Search ..... 137/513.5, 517, 504; 254/93, 254/8.R, 8 B, 8 C; 251/DIG. 3

[56] References Cited

UNITED STATES PATENTS

| | | | |
|---|---|---|---|
| 1,079,985 | 12/1913 | Kaminsky | 137/504 |
| 3,399,699 | 9/1968 | Greene | 137/637 |

*Primary Examiner*—Othell M. Simpson
*Attorney*—Holman & Stern

[57] ABSTRACT

This invention relates to a pressure fluid operated cylinder-and-piston mechanism and discloses a valve structure comprising a compression spring adapted to act as a dampening restriction means when the said mechanism is forced by a heavy load from an extended position into a retracted position upon the opening of a bleed valve.

5 Claims, 4 Drawing Figures

AUTOMATIC CUSHIONING VALVE

This invention relates to an automatic cushioning valve for use in piston and cylinder means, particularly hydraulic or pneumatic jacking means, adapted to bring about a uniform and smooth lowering of the load at a desired speed and allowing in the unloaded state for a rapid return movement.

The return movement of hydraulic or pneumatic jacking means when the load is to be lowered is to be adjusted such that the lowering takes place at the desired speed and without jerks, i.e. the outflow of the pressure medium from the working cylinder of the jacking means must be controllable in a suitable way. This control, of course, may be carried out manually, but this would require a high attentiveness and a certain skill in order to prevent the load from being lowered jerkily or arriving at its bottom position at too high a speed. One may also apply known types of pressure control means which, however, are too bulky and unnecessarily complicated for this purpose. There is, consequently, a demand for a control means which is simple, reliable in operation and cheap.

According to the present invention, this cushioning and pressure control problem is solved by an automatic cushioning valve adapted to adjust the pressure in the outlet passageway from the working cylinder of the jacking means.

The invention is characterized in that it comprises a helical compression spring mounted in a pressure space and having in the unloaded state a small distance between its coil. One end of the spring is secured at a vertical projection in the upper portion of said pressure space and the opposite end of the spring is sealed by a plug. The lower end of the plug has a greater diameter and is retained by said spring. The spring the unloaded or slightly loaded state allows for a free flow of the pressure medium between the spring coils, so that the jacking means when unloaded can rapidly be lowered by releasing the pressure in the pressure space by means of a valve via an outlet passageway. Upon lowering of the jacking means carrying a heavy load, for example a passenger car, the pressure due to its increase by said load causes the spring to be compressed such that spring coils abut one another, in such a way, that there remains for the removal of the pressure medium only a passageway in the form of a helical throttling between the inner surfaces of the tightly abutting coils and the circumferential surface of the plug. The outflow of the pressure medium through the outlet passageway is made possible by a communicating transverse groove in the upper end of the plug.

The present invention has the advantage over conventional pressure control means in that the cushioning valve is extremely simple (no accurately ground pistons or the like are required), cheap to manufacture and reliable in operation.

Figure 2:
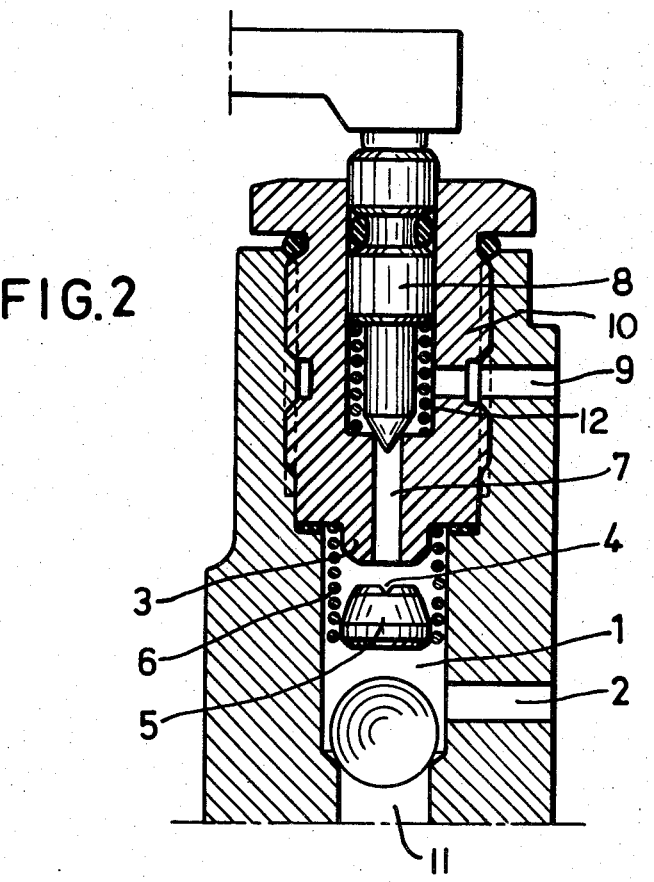
Figure 3:
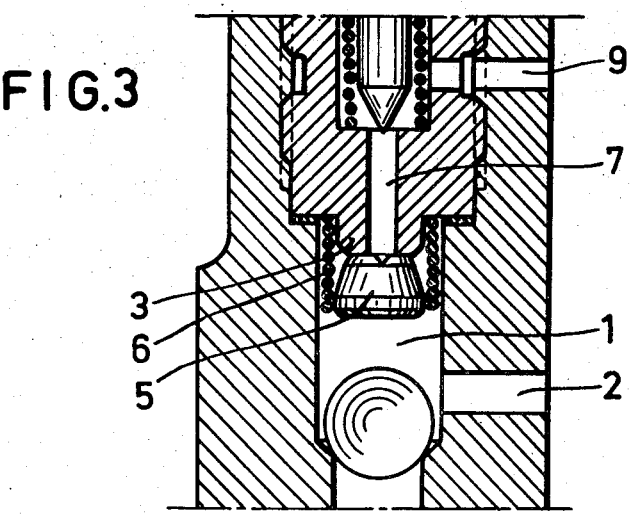
Figure 4:
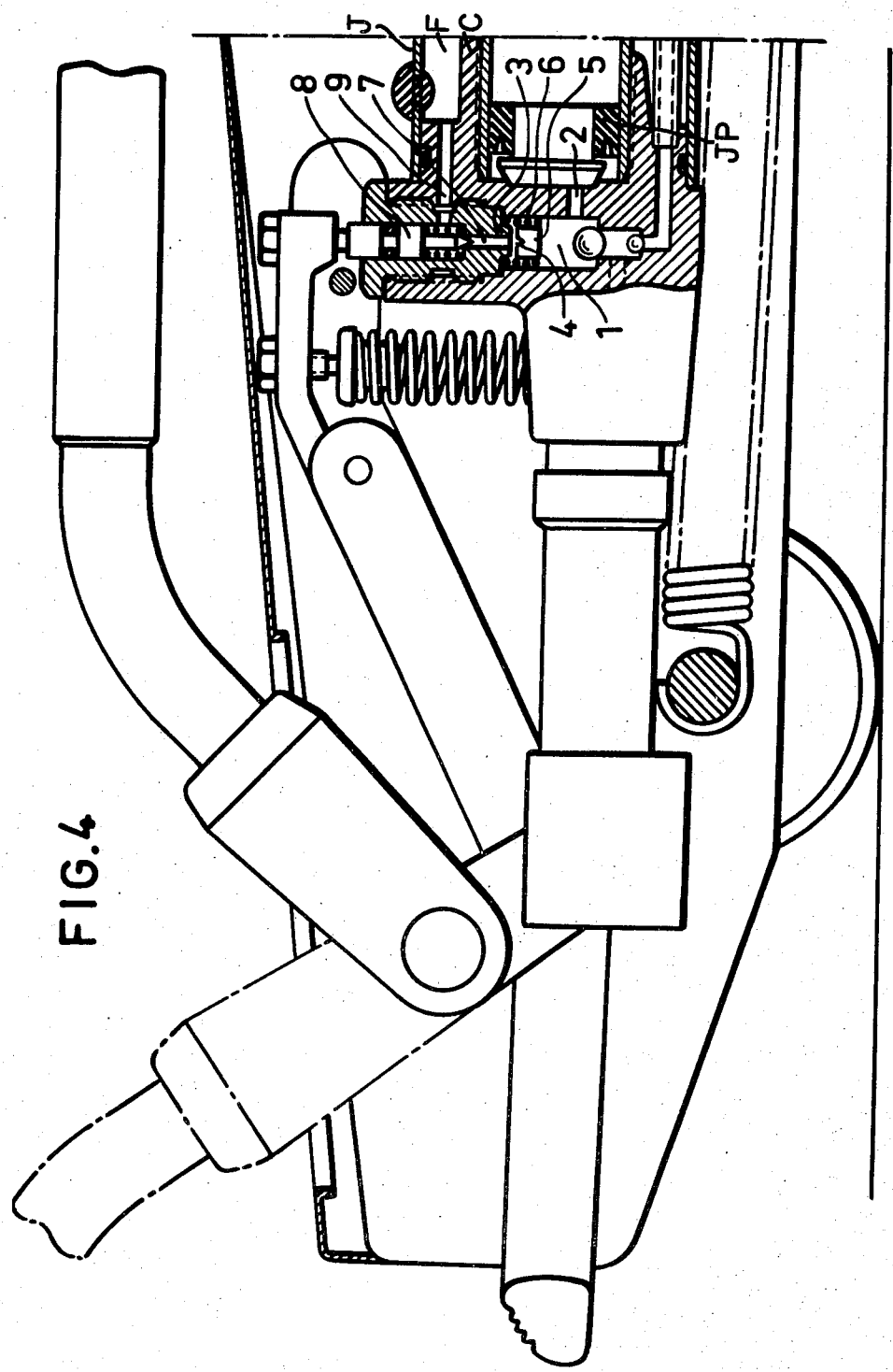

An embodiment of the invention will be described in greater detail hereinafter, with reference to the accompanying drawings in which FIG. 1 is a side elevation view, partly in section, of a hydraulic garage jack, FIGS. 2 and 3 illustrate on an enlarged scale a longitudinal section view of the cushioning valve according to the invention in its two different positions and FIG. 4 is a fragmentary elevation view, partly in section, of the jack illustrated in FIG. 1.

Referring to the drawings, only the jack illustrated is of a type well known in the art and need not be described in full. The lifting of the load is effected by manually actuating pump with the pump lever PL to pump pressurized liquid into the jacking cylinder C through a pressure space 1 and a passageway 2 (FIG. 4), thereby raising the lifting saddle LS carrying the load, for example the front or rear part of a passenger car by means of mechanical linkage known in itself. From the upper portion of the pressure space 1 there extends an outlet passageway 7, the upper mouth of which can be opened and sealingly closed, respectively, by means of a relief valve 8, which for effecting opening is actuated by means of a pedal via a suitable mechanical connection. The passageway 7 which extends within the housing 10 of the relief valve communicated with a passageway 9 through which the jacking fluid can be returned to a fluid supply F from which fluid can be drawn, on pumping, through a passage 11. A ball type check valve 13 is provided between pressure space 1 and the passage 11 from the fluid supply, the latter being held in a jacket J around the cylinder C. Within the pressure space 1, a helical compression spring 6 is mounted, the ends of which are ground flat. The spring, in a preferred embodiment, has a pitch of 1, 2 millimeters, so that with a wire diameter of 1.0 millimeters is the interspace between the coils or spires is 0.2 mm.

The spring 6 (FIG. 2) is secured at one end at an annular extension 3 from the lower portion of the relief valve housing 10 and is closed at its opposite end by a fluid obstructing member in the shape of a part conical plug 5 and is freely suspended in the pressure space 1. In the fully compressed state of the spring, the plug 5 is caused to abut the end face of extension 3. The plug is shaped at its upper end with a transverse groove 4 for permitting fluid from pressure space 1 to flow off through outlet passageway 7.

As evident from FIGS. 2 and 3, the plug 5 on the greater part of its length has a frusto conical shape and this portion has a diameter smaller than the inner diameter of the compression spring. The extension 3 as well as the cylindrical portion of the plug has a diameter slightly exceeding the inner diameter of the spring so as to established firm grip therewith. The spring is mounted first over the extension 3, and thereafter the plug 5 is driven into the spring with such a force that it abuts the extension. The plug thus will obtain its correct position in the spring.

The tapering shape of the plug renders it possible for the spring coils located between the end coils to expand and contract freely, and the conicity facilitates the mounting of the plug. The axial position of the plug relative to the spring is determined at the mounting; and it is additionally by the action of fluid pressure which will urge the plug and the fully compressed spring against the extension 3 when the jack is operated to lift a load and/or to keep it in a raised position.

The spring valve assembly operates as follows. When the lifting saddles LS is to be lowered, the pedal A is actuated. Thereby the relief valve 8 is lifted by its spring 12 and opens the outlet passageway 7. The pressurized fluid in the cylinder C can then flow through the passageway 2 to the pressure space 1. When the jack is to be lowered without a load, the flow rate of the working fluid, such as hydraulic oil, is not capable of compressing the spring 6 and, therefore, the fluid from the pressure space 1 can flow freely through the spring 6 to the passageway 9 and back to the fluid supply F. The lifting saddle thereby is lowered with a load thereon, such as by a motor car, the fluid velocity into pressure space 1 is at the beginning of such a magnitude, that the spring is compressed. The fluid then flows off at a substantially the helical path between the compressed spring coils and the lower rate along plug, through the groove 4 in the plug 5 and further by the outlet passageway 7 and the passageway 9 to the fluid supply F. The jacking piston JP will be returned to its starting position by the action of the load, which, as well understood, will become effectively damped by the spring and plug arrangement described and illustrated.

What I claim is:

1. A fluid-operated cylinder-and-piston jack comprising fluid supply means, pumping means for pressurizing operating fluid drawn from said fluid supply means and return passage means extending between said cylinder and said fluid supply means, a relief valve within said return passage means, actuating means for said relief valve, a helical compression spring, abutment means for supporting within said return passage means said compression spring by one end thereof, a fluid flow obstructing member held by the free end of said compression spring within the outermost portion thereof, to define a helical path forming a restriction between itself and the spires of said spring, the sense of compression of said spring coinciding with the direction of fluid flow through said relief valve.

2. A fluid-operated cylinder-and-piston jack as claimed in claim 1, wherein said fluid flow obstructing member is a part-cylindrical, part frusto-conical plug, engaging by its cylindrical portion the free end of said compression spring and forming by its frusto-conical portion a stop for engaging said abutment means upon complete compression of said compression spring.

3. A fluid operated cylinder-and-piston jack as claimed in claim 1, wherein said compression spring is made of circular cross-section wire with a diameter of 1.0 millimeters and a pitch of 1.2 millimeters in an uncompressed state.

4. A fluid operated cylinder-and-piston jack as claimed in claim 1, wherein the said abutment means is afforded by a coaxial extension of said relief valve.

5. A fluid operated cylinder-and-piston jack as claimed in claim 2, wherein said plug is formed at the end face of its frusto-conical portion with transverse groove means providing a flow connection on the engagement of said end face with said abutment means.

* * * * *